United States Patent [19]

Carson et al.

[11] 4,159,288
[45] Jun. 26, 1979

[54] ACRYLIC MOLDING POWDERS WITH IMPROVED FLOW

[75] Inventors: William G. Carson, Moorestown, N.J.; Stanley W. Wise, Hegins; Edgar R. Lang, Glenside, both of Pa.

[73] Assignee: Rohm and Haas Company, Philadelphia, Pa.

[21] Appl. No.: 877,207

[22] Filed: Feb. 13, 1978

Related U.S. Application Data

[63] Continuation-in-part of Ser. No. 751,231, Dec. 16, 1976, abandoned.

[51] Int. Cl.$^2$ .................. C08L 33/06; C08L 33/08; C08L 33/10; C08L 33/12
[52] U.S. Cl. ............................................ 260/901
[58] Field of Search ....................................... 260/901

[56] References Cited

U.S. PATENT DOCUMENTS

| 2,887,464 | 5/1959 | Coover et al. .................... 260/901 |
| 3,681,475 | 8/1972 | Spilner ............................. 260/901 |

*Primary Examiner*—Carman J. Seccuro
*Attorney, Agent, or Firm*—Michael B. Fein

[57] ABSTRACT

A method of improving flow of acrylic molding powders, without significantly diminishing the heat distortion, strength and toughness properties, comprising mixing therewith a flow modifier polymer which has a specified compatibility relationship with said molding powder, as defined by a specified difference in solubility parameters. The resulting compositions are also disclosed.

7 Claims, No Drawings

ACRYLIC MOLDING POWDERS WITH IMPROVED FLOW

This application is a continuation-in-part of Ser. No. 751,231 filed Dec. 16, 1976, now abandoned.

BACKGROUND OF THE INVENTION

1. Field of the Invention

This invention relates to a method for improving the flow of acrylic molding powders.

2. Description of the Prior Art

In the acrylic molding powder art, it is generally desirable for the acrylic molding polymers to have as low a melt viscosity as possible without a sacrifice in other important properties such as heat distortion, impact strength, and toughness. A low melt viscosity facilitates molding because it permits the use of low melt temperatures without excessively high mold filling pressures. For a given softening temperature, a lower melt viscosity permits faster cooling and therefore higher molded part production rates. One prior method of reducing polymer melt viscosity was to lower the molecular weight of the polymer; however, below a certain molecular weight level strength and toughness of the molding polymer are adversely affected. Another prior way to reduce melt viscosity was to blend the molding polymer with a low viscosity additive or plasticizer. See, for example, U.S. Pat. No. 3,655,829 of Apr. 11, 1972 to Ronzoni et al., and U.S. Pat. No. 3,809,667 of May 7, 1974 to Coaker et al. Also see West German Pat. No. 2,264,628 of July 12, 1973 corresponding to U.S. Ser. No. 215,114 of Jan. 3, 1972. However, these prior methods cause a loss in heat distortion, creep resistance, clarity, and/or toughness. An alternative method to reduce viscosity is to lower the overall glass temperature by copolymerizing with the monomer of a polymer having a relatively low glass temperature, but this also reduces heat distortion resistance. Others have attempted to improve the melt flow rate of thermoplastic polymers with such modifiers as an alpha-methyl benzyl alcohol diester of carbonic, phthalic, or ($C_2$–$C_{10}$) normal aliphatic saturated dicarboxylic acid (Showa Denko KK, Derwent Abstract 6436T corresponding to Japanese Pat. No. 7238540), ethylene glycol fatty acid diester mixed with pentaerythritrol fatty acid tetraester and alkaline earth metal soap (Nippon Oils and Fats Company, Ltd., Derwent Abstract 67326U corresponding to Japanese Pat. No. 7335697), a higher fatty acid amide or xylene diamine added during polymerization (Derwent 67832S corresponding to Japanese Pat. No. 7136458), or xylene diamine stearic acid amide (Derwent 57831S corresponding to Japanese Pat. No. 7135457).

Coover et al, U.S. Pat. No. 2,887,464, teach modification of copolymers of methyl methacrylate and α-methyl styrene with a lesser proportion of an acrylic or methacrylic ester polymer or with a lesser proportion of a butadiene-1,3 polymer. Coover et al do not suggest modification of all acrylic molding powder polymers.

None of the prior systems allows for increased melt flow of acrylic molding powder without significantly diminishing the heat distortion strength and toughness.

SUMMARY OF THE INVENTION

It is therefore an object of the present invention to provide a method for improving the melt flow of acrylic molding powder polymers without significantly diminishing the heat distortion strength and toughness.

A second object is to provide a composition for molding based on an acrylic molding powder having reduced melt viscosity but having strength and toughness substantially to the acrylic molding powder itself.

These objects and others as will become apparent from the following description are achieved by the present invention which comprises a method of improving the melt flow of an "acrylic molding polymer" without significantly diminishing the heat distortion, strength and toughness properties, comprising mixing with said acrylic molding polymer a flow modifier polymer wherein the difference in solubility parameters, $\Delta S$, between the two polymers is about 0.2 to 0.8. Also, the invention comprises compositions comprising the two polymers.

For purposes of this invention, an acrylic molding powder polymer is defined as a polymer of at least 50%, up to 100%, by weight methyl methacrylate with the balance essentially all acrylate or methacrylate, i.e., esters of acrylic or methacrylic acid, having a viscosity average molecular weight of about 50,000 to 300,000, not containing polyunsaturated monomer units, having a glass temperature above about 25° C., and solid at room temperature. "Acrylic molding powder" is intended to include powder, pellets, granules, and the like which are typically used to make molded articles by heating the molding powder in a mold.

"Flow modifier polymer" is defined for purposes of this invention as a polymer of a monomer system comprised of at least 50% by weight $C_1$ to $C_{12}$ alkyl or cycloalkyl acrylate or methacrylate or mixtures thereof, with the balance selected from monoethylenically unsaturated copolymerizable monomers, having a viscosity average molecular weight of about 50,000 to 300,000, not containing polyunsaturated monomer units, solid at room temperature above about 25° C., but said flow modifier polymer being different from said acrylic molding powder polymer.

The difference between the acrylic molding polymer and the flow modifier polymer is one of the key features of this invention. Each of the polymers has a solubility parameter, as defined herein, and in accordance with this invention the two polymers must have a difference in solubility parameters of about 0.2 to 0.8. Preferably the difference in solubility parameters is about 0.3 to 0.5. The physical effect of the specific difference in solubility parameters is a specific degree of incompatibility of the two polymers. A given difference in solubility parameters defines a degree of incompatability; when the difference in solubility parameters is zero, the two polymers are fully compatible, but this would be unacceptable in accordance with this invention.

Surprisingly, when the compatibility of the acrylic molding polymer and the flow modifier is too high, as defined by a difference in solubility parameters of below about 0.2, much of the viscosity reducing function of the flow modifier is lost. When the compatability is too low, there is a significant loss in toughness.

The term solubility parameter has been widely employed to characterize quantitatively the polar characteristics of polymers, and information is now available in the literature to enable determination of solubility parameters for nearly any polymers which can be prepared. Solubility parameter is a function only of repeating unit in the polymer, and is calculated by the method of Small, *J. Appl. Chem.*, Vol. 3, p. 71 (1953). Other methods of calculating or experimentally determining solubility parameter are available, but only Small's method is used for the purposes of this invention. With a knowledge of the difference in solubility parameters, it is possible to approximate the degree to which two polymers are compatible.

Another important feature of the invention is that the ratio of melt flow rate of the acrylic molding powder polymer to the flow modifier polymer be less than 0.25, preferably less than 0.1. Melt flow rate is defined by a standarized test: ASTM D 1238-62 (Condition I).

Based on the mixture of acrylic molding powder polymer and flow modifier polymer, flow-modified polymer can be present in amounts of about 1 to 50 percent, preferably about 5 to 30 percent, by weight; the particular flow modifier concentration affects properties in a way which would be expected in that variations caused by a given modifier are either enhanced or diminished by larger or smaller amounts of modifier in the blend.

It is highly preferred that the flow-modifier and the base polymer be matched in refractive index so that parts molded from the blends of the two polymers are highly transparent. Even when the refractive indices of the two polymers are matched, extrusions of these blends are less transparent because of surface roughness which appears to be caused by the incompatibility of the blending components. Parts molded from these blends have smooth surfaces and are transparent at one temperature but tend to become hazy at higher temperatures because there is a significant difference in the rate of refractive index change with temperature for the two blend components above their glass temperatures, and this creates a mismatch at extreme temperatures. One convenient way to achieve refractive index matching is to introduce a small amount of styrene comonomer in the flow modifier polymer to adjust its refractive index to that of the acrylic molding powder monomer.

The polymers in the blends are prepared separately, separately isolated to solid forms, and are then mixed as solids, preferably in an extruder to achieve a uniform blend. The polymers can be prepared in any manner, for example by suspension, bulk, solution or emulsion polymerization. The size of the polymer pellets or granules can be widely varied.

It is important to achieving the desired degree of compatibility that neither the base polymer nor the modifier polymer be crosslinked; therefore it is essential that the polymers be prepared in the absence of crosslinking monomer, since crosslinking of the polymers results in incompatibility.

The acrylic molding powder can also include an impact modifier such as those disclosed in Owens U.S. Pat. No. 3,793,402 of Feb. 19, 1974; U.S. Pat. No. 3,808,180 of Apr. 30, 1974; and U.S. Pat. No. 3,843,753 of Oct. 22, 1974; or any other impact modifiers, pigments, colorants, fillers, and the like. The impact modifier is usually crosslinked in at least one stage.

Usually styrene is included in the second polymer so as to allow for adjustment of refractive index. The molecular weight of the flow modifier is about 50,000 to 300,000.

The glass transition temperature of the flow modifier should be at least about 25° C.

In the following examples all parts are by weight unless otherwise indicated, and the following abbreviations are used:

Methyl methacrylate (MMA); ethyl methacrylate (EMA); N-butyl methacrylate (BMA); isobornyl methacrylate (IBOMA); methyl acrylate (MA); n-butyl acrylate (BA); styrene (S); ethyl acrylate (EA); 1 lauryl acrylate (LA); and "polymer of" is represented by "p."

EXAMPLES 1 to 14

Flow modifiers having the compositions set forth in Table I were prepared by bulk polymerization using t-butyl hydroperoxide (0.011%), acetyl peroxide (0.05%), and lauroyl peroxide (0.025%), polymerizing for 20 hours at 65° C., 1 hour at 80° C., 1 hour at 90° C., 6 hours at 120° C. The flow modifiers of Examples 1 to 8 have glass transition temperatures of 54°–55° C., the flow modifiers of Examples 9, 11, 13, and 14 have glass transition temperatures of 45° C., and the flow modifiers of Examples 10 and 12 have glass transition temperatures of 65° C. All of the flow modifiers have viscosity average molecular weights of 75,000 and refractive indices of 1.489. Their intrinsic viscosities are all 0.2 to 0.4 dl/gm. The compositions of these flow modifiers is set forth in Table I.

TABLE I

| Flow Modifier No. | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Methyl methacrylate | 27.3 | 39.9 | | | 24.9 | | 12.7 | 70 | 51.8 | 69.8 | 39.5 | 48.5 | 18.8 | 6.6 |
| Ethyl methacrylate | 34.0 | | 86.6 | 83.5 | | 54.4 | | | | | | | | |
| n-butyl methacrylate | | 55.8 | | | 60.1 | 15.3 | 64.5 | | | | 50 | 43.7 | 69.3 | 73.7 |
| iso-bornyl methacrylate | | | | 2.3 | 12.8 | 16.3 | 21.3 | 30 | | | | 5.8 | 8.7 | 17.2 |
| Methyl acrylate | 34 | | | | | | | | 13.7 | 8.6 | | | | |
| Ethyl acrylate | | | | | | | | | 27.8 | 17.4 | | | | |
| n-butyl acrylate | | | 7.2 | 8.2 | | 9.7 | | | | | 6 | | | |
| Styrene | 4.7 | 4.3 | 6.2 | 6.0 | 2.2 | 4.3 | 1.5 | | 6.7 | 4.2 | 4.5 | 2 | 3.2 | 2.5 |

EXAMPLE 15

This example illustrates the effect of the flow modifiers made in Examples 1 through 14 on an MMA/EA (99/1 by weight) molding powder polymer having a viscosity average molecular weight of 110,000. All blends contained a ¼ ratio of flow modifier to molding powder polymer, blending being achieved by passing a mixture of granules of the two polymers through a single screw extruder. Good mixing is obtained with a single pass since sample given multiple passes had the same properties as single pass samples. Pellets prepared from the extruded blend are tested for various properties either directly or after being injection molded into suitable test specimens. All blends are highly transparent because of the refractive index match between the flow modifiers and the p(MMA/EA). The results of testing the blends are presented in the following Table II. As the test data show, each of the modifiers increases the melt flow rate without substantially decreasing the distortion temperature, strength, or toughness.

TABLE II

| Flow Modifier | No Modifier | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| Example No. | | | | | | | | | | | | | | | |
| Melt Viscosity (450° F. 400 sec$^{-1}$), poise | 6450 | 3650 | 2420 | 2330 | 2490 | 1790 | 1520 | 1430 | 1790 | 3580 | 4120 | 2060 | 2510 | 1070 | 1070 |
| Melt Flow Rate (ASTM D 1238, Condition I), gm/10 min | 4 | 17 | 18 | 18 | 16 | 26 | 31 | 43 | 30 | 13 | 11 | 26 | 19 | 56 | 75 |
| Spiral Flow*, in. | 20 | 31 | 44 | 60 | 60 | 73 | 73 | 73 | 49 | 40 | 39 | 50 | 39 | 73 | 73 |
| Distortion Temp. under 264 psi Flexural Load (ASTM D 648), °C. | 87 | 80 | 87 | 90 | 85 | 86 | 86 | 85 | 85 | 83 | 83 | 85 | 88 | 86 | 82 |
| Tensile Impact Str.,** ft-lbs/in.$^2$ | 17.6 | 17.6 | 14.4 | 17.6 | 18.2 | 13.9 | 7.7 | 8.0 | 8.1 | 16.8 | 16.6 | 15.2 | 13.2 | 6.9 | 2.4 |
| Charpy Unnotched Impact Str. (ASTM D 256), ft-lbs/in. | 5.8 | 5.3 | 4.9 | 4.5 | 4.8 | 4.3 | 3.3 | 2.3 | 1.5 | 5.7 | 6.1 | 5.2 | 4.3 | 2.0 | 1.5 |
| Tensile Str., psi × 10$^{-3}$ | 8.6 | 8.6 | 5.6 | 5.1 | 5.0 | 5.6 | 4.9 | 6.0 | 6.7 | 6.5 | 6.6 | 7.3 | 5.3 | 5.0 | 5.5 |
| Tensile Max. Elongation, % | 2.6 | 2.5 | 1.5 | 1.3 | 1.3 | 1.6 | 1.2 | 1.6 | 2.0 | 1.6 | 1.6 | 2.0 | 1.3 | 1.4 | 1.5 |
| Modulus of Elasticity, psi × 10$^{-5}$ | 1.27 | 4.47 | 3.92 | 4.09 | 4.06 | 3.94 | 4.14 | 4.35 | 3.83 | 4.50 | 4.50 | 4.20 | 4.30 | 3.80 | 3.80 |
| Diff. in Solubility - Interaction Parameters of Flow Modifiers and PMMA | | 0 | 0.344 | 0.344 | 0.344 | 0.544 | 0.544 | 0.688 | 0.877 | 0 | 0 | 0.344 | 0.5 | 0.7 | 0.688 |

*Samples were injection molded at 500° F. melt temp. and 1000 psi injection pressure in a spiral mold and the distance of melt travel was determined.
**Tensile specimens described in ASTM D 1709 are tested under impact loading.

EXAMPLES 15 to 18

This example illustrates the invention wherein a large decrease in melt viscosity without much loss in other properties is achieved by blending 25% of flow modifiers 3 or 11 with a poly(methyl methacrylate) polymer acrylic molding powder, of 110,000 viscosity average molecular weight and a solubility parameter, alpha, of 9.3. The acrylic molding polymer had a glass temperature of 105° C. The results of these two experiments are set forth in Table III, in which the molding powder polymer (pMMA) is Example 16, a blend of acrylic molding polymer and flow modifier of Example 3 is Example 17, and a blend of acrylic molding polymer and the flow modifier of Example 11 is Example 18.

TABLE III

| EXAMPLE NUMBER | 16 (Comparative) | 17 | 1 |
|---|---|---|---|
| MODIFIER NUMBER | none | 3 | 11 |
| Difference in Solubility Parameter | — | 0.344 | 0.344 |
| Glass Temperature, °C. | — | 54 | 45 |
| Molecular Weight | — | 110,000 | 110,000 |
| Melt Viscosity (450° F., 400 sec$^{-1}$), poise | 6450 | 2960 | 2320 |
| Melt Flow Rate (Cond. I) gm/10 min. | 4 | 11 | 15 |
| Spiral Flow, in. | 20 | 47 | 39 |
| Distortion Temp Under 264 psi load, °C. | 87 | 88 | 89 |
| Tensile Impact Str. ft./lbs./in.$^2$ | 17.6 | 17.6 | 18.2 |
| Charpy Unnotched Impact Strength ft./lbs./in. | 5.8 | 5.4 | 5.7 |
| Tensile Str. psi × 10$^{-3}$ | 8.6 | 7.0 | 6.1 |
| Tensile Max. Elongation, % | 2.6 | 2.0 | 1.7 |
| Modulus of Elasticity, psi × 10$^{-5}$ | 4.30 | 4.10 | 4.10 |

EXAMPLE 19

This example illustrates modification of flow of acrylic molding powder which includes an impact modifier. A 50/50 blend of poly(MMA/EA), (96/4), having a Tg of 98° C. and viscosity average molecular weight of 115,000 with an impact modifier made in accordance with Example 2 of U.S. Pat. No. 3,793,402, having properties listed in the Table IV under the heading "Polymer A" is flow modified by addition of 5% by weight and 20% by weight, respectively, of the flow modifier prepared herein in Example 2.

EXAMPLE 20

An acrylic molding powder having a Tg of 98°-100° F., viscosity average molecular weight 195,000, and composition MMA/EA(90/4), having properties listed in the following Table 15 under the heading "Polymer B," is modified with 20% by weight of the flow modifier of Example 2, resulting in properties listed in Table IV under the heading "Polymer A."

TABLE IV

| | Polymer B | 80 Polymer B 20 Mod. No. 2 | Polymer A | 95 Polymer A 5 Mod. No. 2 | 80 Polymer A 20 Mod. No. 2 |
|---|---|---|---|---|---|
| Melt Viscosity (450° F., 400 sec$^{-1}$), poise | 8600 | 4700 | 8400 | 6100 | 5000 |
| Melt Flow Rate (Cond. I), gm/10 min. | 0.4 | 3 | 1.2 | 1.6 | — |
| Spiral Flow, in. | 10 | 28 | 25 | 36 | — |
| Distortion Temp. under 264 psi load, °C. | 91 | 88 | 80 | 78 | 73 |
| Tensile Impact Str. | | | | | |

TABLE IV-continued

|  | Polymer B | 80 Polymer B 20 Mod. No. 2 | Polymer A | 95 Polymer A 5 Mod. No. 2 | 80 Polymer A 20 Mod. No. 2 |
|---|---|---|---|---|---|
| ft.-lbs./in.$^2$ | 21 | 18 | 63 | 62 | 31 |
| Charpy Unnotched Impact Str. ft.-lbs./in. | 7.5 | 6.5 | 25 | 29 | 18 |
| Izod Notched Impact Str. ft.-lbs./in. | — | — | 0.9 | 0.9 | 0.3 |
| Tensile Str. psi × 10$^{-3}$ | 10.3 | 9.0 | 5.8 | 6.2 | 5.9 |
| Tensile Max. Elongation, % | 5.3 | 3.9 | 78 | 76 | 95 |
| Modulus of Elasticity psi × 10$^{-5}$ | 4.60 | 4.00 | 2.10 | 2.20 | 2.30 |

EXAMPLE 21

Comparative

This example compares the acrylic molding powder-flow modifier system with the analogous embodiment of Coaker et al, U.S. Pat. No. 3,809,667. Table VII of Coaker et al. shows a low molecular weight BA/LA(40/60) liquid copolymer as lubricant for p(MMA) acrylic molding powder, resulting in a reduction apparent viscosity without significantly changing the heat distortion temperature. Coaker et al. do not teach matching of refractive indices to obtain clear compositions, but since this is an object of the present invention, upon repeating Coaker et al., a liquid copolymer of BA/LA/S(30.94/46.4/22.66) was substituted so as to match the refractive index of the acrylic powder which was 1.489. The acrylic molding powder used was that of Example 19 except instead of a 50% concentration of impact modifier, a 45% concentration was used.

A. Five parts of the above-mentioned Coaker et al copolymer were extrusion blended with 95 parts of the above-mentioned acrylic molding powder. The resultant material was tested for melt viscosity, impact strength, and weight gain and appearance after 8 days immersion in petroleum ether at 25° C. The results are shown in Table V.

B. Ten parts of the flow modifier used in in accordance with this invention are extrusion blended with the above-mentioned acrylic molding powder, and the resultant material was tested for the same properties as A, supra, with the results shown in Table V.

TABLE V

| EXAMPLE | 21C Acrylic Molding | 21A Coaker et al | 21B Invention |
|---|---|---|---|
| Izod Notched Impact Strength ft.-lb./in. of notch,± 0.05 | 1.0 | 0.75 | 0.9 |
| Izod Unnotched Impact Strength, ft.-lb., ± 1 | 13.5 | 8 | 12 |
| Charpy Unnotched Edgewise Umpact Strength, ft.-lb. ¼" × 1", ± 1 | 27 | 9 | 24 |
| Melt Viscosity, poise, 450° F./400 sec.$^{-1}$ | 8864 | 6076 | 6254 |
| Wt. gain at 8 days immersion, % | 1.0 | 2.3 | 1.4 |
| Average (haze) | None | Very Hazy | Slighty Hazy |

EXAMPLE 22

Example 15 was repeated except using 5% and 10%, respectively, of the Coaker et al liquid copolymer lubricant described in Example 21 (BA/LA/S) (30.94/46.4/22.66). The blends could not be extruded because the blend would not stay between the flights of the screw, but would rise back up into the hopper, even when force fed.

We claim:

1. A method of improving the melt flow of acrylic molding powder polymers comprising mixing with the acrylic molding powder polymer from 1 to 50% by weight, based on mixture, of a flow modifier polymer which is solid at room temperature, wherein the difference in solubility parameter between the acrylic molding powder polymer and the flow modifier polymer is about 0.2 to 0.8, and the ratio of melt flow rate of the acrylic molding powder polymer to the flow modifier polymer is less than 0.25, said acrylic molding powder polymer being a polymer of at least 50%, up to 100%, by weight methylmethacrylate with the balance essentially all esters of acrylic or methacrylic acid, not containing polyunsaturated monomer units, and having a glass temperature above about 25° C., said flow modifier polymer being a polymer of a monomer system comprised of at least 50% by weight $C_1$ to $C_{12}$ alkyl or cycloalkyl acrylate or methacrylate or mixtures thereof, with the balance selected from monoethylenically unsaturated copolymerizable monomers, having a viscosity average molecular weight of about 50,000 to 300,000, not containing polyunsaturated monomer units and solid at room temperature above about 25° C., but different from said acrylic molding powder polymer.

2. The method of claim 1 wherein the difference in solubility parameters is about 0.3 to 0.5.

3. The method of claim 1 wherein the ratio of melt flow rates is below 0.1.

4. The method of claim 1 wherein the refractive indices of the two polymers are matched.

5. A composition comprising a mixture of acrylic molding powder polymer and from 1 to 50% by weight, based on mixture, of a flow modifier polymer which is solid at room temperature, wherein the difference in solubility parameter between the acrylic molding powder polymer and the flow modifier polymer is about 0.2 to 0.8, and the ratio of melt flow rate of the acrylic molding powder polymer to the flow modifier polymer is less than 0.25, said acrylic molding powder polymer being a polymer of at least 50%, up to 100%, by weight methylmethacrylate with the balance essentially all esters of acrylic or methacrylic acid, not containing polyunsaturated monomer units, and having a glass temperature above about 25° C., said flow modifier polymer being a polymer of a monomer system comprised of at least 50% by weight $C_1$ to $C_{12}$ alkyl or cycloalkyl acrylate or methacrylate or mixtures thereof, with the balance selected from monoethylenically unsaturated copolymerizable monomers, having a viscosity average molecular weight of about 50,000 to 300,000, not containing polyunsaturated monomer units and solid at room temperature above about 25° C., but different from said acrylic molding powder polymer.

6. A composition according to claim 5 wherein the difference in solubility parameters is about 0.3 to 0.5.

7. A composition according to claim 5 wherein the ratio of melt flow rates is below 0.1.

* * * * *